(12) United States Patent
Li

(10) Patent No.: US 9,748,853 B1
(45) Date of Patent: Aug. 29, 2017

(54) SEMI-DUAL-ACTIVE-BRIDGE CONVERTER SYSTEM AND METHODS THEREOF

(71) Applicant: Macau University of Science and Technology, Macau (CN)

(72) Inventor: Xiaodong Li, Macau (CN)

(73) Assignee: Macau University of Science and Technology, Macau ( * ) Notice: Subject to any disclaimer, the term of this patent is extended or adjusted under 35 U.S.C. 154(b) by 0 days.

(21) Appl. No.: 15/339,943

(22) Filed: Nov. 1, 2016

(51) Int. Cl.
*H02M 3/335* (2006.01)
*H02M 1/14* (2006.01)
*H02J 7/00* (2006.01)
*H05B 33/08* (2006.01)

(52) U.S. Cl.
CPC ....... *H02M 3/33546* (2013.01); *H02J 7/0052* (2013.01); *H02M 1/14* (2013.01); *H05B 33/0815* (2013.01)

(58) Field of Classification Search
CPC ......... H02M 3/33569; H02M 3/33584; H02M 3/33592; H02M 3/33576
See application file for complete search history.

(56) References Cited

U.S. PATENT DOCUMENTS

| | | | | |
|---|---|---|---|---|
| 6,836,414 B1* | 12/2004 | Batarseh | ........... | H02M 3/33569 363/132 |
| 9,257,864 B2* | 2/2016 | Pahlevaninezhad | .... | H02J 7/022 |
| 9,270,187 B2* | 2/2016 | Takagi | .............. | H02M 3/33584 |
| 9,270,189 B2* | 2/2016 | Rosado | ............ | H02M 3/33584 |
| 9,300,219 B2* | 3/2016 | Hirano | .............. | H02M 3/33561 |
| 9,627,979 B2* | 4/2017 | Safaee | .............. | H02M 3/33507 |
| 2009/0034299 A1* | 2/2009 | Lev | .................... | H02M 3/33592 363/17 |
| 2011/0026281 A1* | 2/2011 | Chapman | .................. | H02J 3/38 363/65 |
| 2011/0249472 A1* | 10/2011 | Jain | .................... | H02M 3/33584 363/15 |
| 2011/0298305 A1* | 12/2011 | Chisenga | .............. | H02M 3/156 307/151 |
| 2012/0014138 A1* | 1/2012 | Ngo | .................... | H02M 3/33584 363/17 |
| 2012/0063177 A1* | 3/2012 | Garrity | ................... | H02J 3/383 363/37 |
| 2013/0188397 A1* | 7/2013 | Wu | .................... | H02M 3/33576 363/17 |
| 2014/0254204 A1* | 9/2014 | Kao | .................. | H02M 3/33584 363/17 |
| 2015/0131330 A1* | 5/2015 | Pan | ......................... | H02M 3/07 363/17 |
| 2015/0171729 A1* | 6/2015 | Scandola | .............. | H02M 3/158 363/21.02 |

(Continued)

*Primary Examiner* — Timothy J Dole
*Assistant Examiner* — Yusef Ahmed
(74) *Attorney, Agent, or Firm* — Eagle IP Limited; Jacqueline C. Lui

(57) ABSTRACT

One example embodiment is a method executed by a microcontroller with a Pulse Width Modulation (PWM) circuit to control a semi-dual-active-bridge (SDAB) converter that includes a first side bridge circuit, a second side bridge circuit and a transformer. The microcontroller determines a current operation mode and a target operation mode of the SDAB converter. The microcontroller determines an optimal ratio and calculates changes of each gating signal that are applied to the first side bridge circuit and the second side bridge circuit respectively.

20 Claims, 11 Drawing Sheets

(56) References Cited

U.S. PATENT DOCUMENTS

| | | | |
|---|---|---|---|
| 2015/0194900 A1* | 7/2015 | Zheng | H02M 3/33592 363/17 |
| 2015/0349649 A1* | 12/2015 | Zane | H02M 3/33507 363/21.03 |
| 2015/0365005 A1* | 12/2015 | Panov | H02M 3/33584 307/24 |
| 2016/0016479 A1* | 1/2016 | Khaligh | B60L 11/1812 363/17 |
| 2016/0139651 A1* | 5/2016 | Schramm | G06F 1/3287 713/323 |
| 2016/0211690 A1* | 7/2016 | Li | H02J 7/0052 |
| 2016/0233776 A1* | 8/2016 | Nielsen | H02M 3/33584 |
| 2016/0294294 A1* | 10/2016 | Ye | H02M 3/33592 |
| 2016/0352236 A1* | 12/2016 | Yoo | H02M 3/33584 |
| 2017/0098993 A1* | 4/2017 | Scherbaum | H02M 3/33546 |

* cited by examiner

US 9,748,853 B1

SEMI-DUAL-ACTIVE-BRIDGE CONVERTER SYSTEM AND METHODS THEREOF

FIELD OF THE INVENTION

The present invention relates to power converters, and more particularly to a semi-dual-active-bridge (SDAB) converter system and methods thereof.

BACKGROUND

Power conversion systems are important in addressing possible energy crisis and environmental issues. A DC (direct current)-DC converter converts a source of DC from one voltage level to another. DC converters are widely used in a variety of industrial fields such as renewable energy generation and DC motor drives, as well as portable electronic devices such as smartphones and laptop computers. One typical DC converter is dual active bridge (DAB) converter that supports bidirectional power flow.

New power conversion systems and methods that assist in advancing technological needs and industrial applications are desirable.

SUMMARY OF THE INVENTION

One example embodiment is a method executed by a microcontroller with a Pulse Width Modulation (PWM) circuit to control a SDAB converter that includes a first side bridge circuit, a second side bridge circuit and a transformer. The microcontroller determines a current operation mode and a target operation mode of the SDAB converter. The microcontroller determines an optimal ratio and calculates changes of each gating signal that are applied to the first side bridge circuit and the second side bridge circuit respectively.

Other example embodiments are discussed herein.

DETAILED DESCRIPTION

Figure 1:
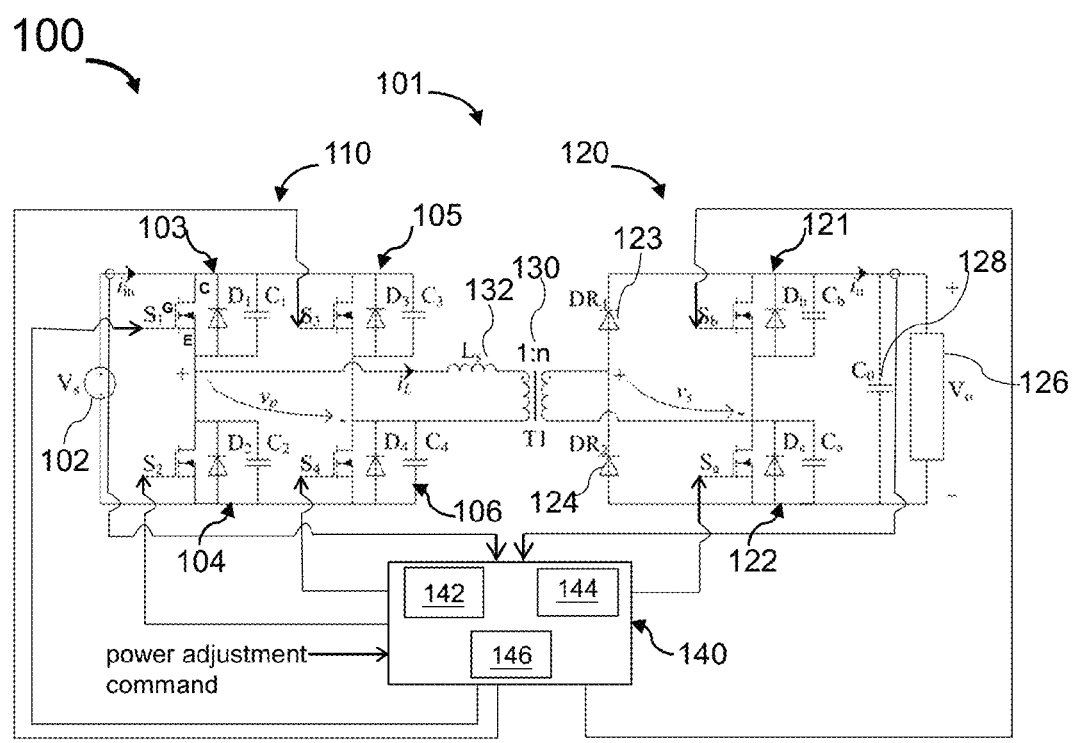
FIG. 1 shows a SDAB converter system in accordance with an example embodiment.

Example embodiments relate to apparatus and methods that provide a semi-dual-active-bridge (SDAB) converter system that includes a SDAB converter and a microcontroller that controls the SDAB converter.

An example embodiment includes a SDAB converter that includes a transformer having a primary winding and a secondary winding with a primary-to-secondary turns ratio of 1:n, a first side bridge circuit that connects to the primary winding of the transformer and includes four active switches, and a second side bridge circuit that connects to the secondary winding of the transformer and includes two active switches and two diodes.

The SDAB converter is a unidirectional direct current (DC)-DC converter. Power is transferred from the first side bridge circuit to the second side bridge circuit via the transformer. Manipulation of power transferred from source or input to load or output of the SDAB converter is realized by means of controlling phase shift angle $\Phi$ between the first side bridge circuit and the second side bridge circuit of the SDAB converter. When a power-change command or power adjustment command is received or triggered, an adjustment or time delay $\phi$ is added to the phase shift angle $\Phi$, and the SDAB converter moves from one steady state to another.

During state transition, it is detrimental to have DC or DC bias current flowing through the transformer even temporarily, which takes some time to diminish through equivalent series resistance that includes resistance of connection wires and conduction resistance of switches for example.

In an example embodiment, it is designed such that the phase shift angle is changed in an optimal way to reduce or eliminate DC or DC bias current in the transformer during state transition and thus shorten transition time. By way of example, such fast transition control is achieved by a microcontroller in communication with the SDAB converter. For example, with the microcontroller, the adjustment or time delay $\phi$ is divided into two parts that are applied to gating signals on the two sides (i.e. the first side bridge circuit and the second side bridge circuit of the SDAB converter) according to an optimized ratio x. For example, x$\phi$ is a phase shift angle that is adjusted during transition of the first side bridge circuit, and (1−x)$\phi$ is a phase shift angle that is adjusted during transition on the second side bridge circuit. This adjustment reduces or even eliminates the DC bias current during state transition and shortens transition time such that the SDAB converter moves from one steady state to another instantly without any temporal disturbances.

In one example embodiment, the microcontroller includes a processor and a Pulse Width Modulation (PWM) circuit. The microcontroller controls the SDAB converter such that the adjustment $\phi$ is divided optimally into two parts that are applied to gating signals of active switches of two sides of the SDAB converter and realizes a zero DC bias current immediately after one-cycle transition.

By way of example, the microcontroller receives or senses an input voltage $V_s$ and an output voltage $V_o$ of the SDAB converter and calculates a converter gain M of the SDAB converter, wherein M=n$V_o$/$V_s$. The microcontroller determines a current operation mode for the SDAB converter based on a phase shift angel $\Phi$ between the first side bridge circuit and the second side bridge circuit. Response to a power adjustment command, the microcontroller calculates an adjustment $\phi$ to be added to the phase shift angle $\Phi$ and determines a target operation mode based on the adjustment $\phi$. The microcontroller determines an optimal ratio x based on the current operation mode and the target operation mode, and calculates changes of each gating signal that are applied to the first side bridge circuit and the second side bridge circuit respectively to generate calculated gating signals and sends the calculated gating signals to the PWM circuit to generate modulated gating signals, and transmits the modulated gating signals to the first side bridge circuit and the second side bridge circuit respectively.

By way of example, there are four operation modes for a SDAB converter, which are Mode A, Mode B, Mode C and discontinuous-current mode (DCM). Response to a power adjustment command, the SDAB converter moves or jumps from one steady state to another. The two states can be in a same operation mode or in two different operation modes depending on adjustment of the phase shift angle between two sides of the SDAB converter.

FIG. 1 shows a SDAB converter system 100 in accordance with an example embodiment. The SDAB converter system 100 includes a SDAB converter 101 and a microcontroller 140. The SDAB converter 101 has a first side bridge circuit 110 and a second side bridge circuit 120. The first side bridge circuit 110 and the second side bridge circuit 120 are isolated by a transformer 130 having a primary winding and a secondary winding with a primary-to-secondary turns ratio of 1:n. The first side bridge circuit 110 connects or couples to the primary winding of the transformer 130, and the second side bridge circuit 120 connects or couples to the second winding of the transformer 130.

As shown in FIG. 1, the first side bridge circuit 110 includes four active switches 103, 104, 105, and 106, while the second side bridge circuit 120 includes two active switches 121 and 122, and two diodes 123 (also named $DR_1$) and 124 (also named $DR_2$).

By way of example, the active switches 103 and 106 are diagonally opposed within the first side bridge circuit 110, and the active switches 104 and 105 are diagonally opposed within the first side bridge circuit 110. The active switch 121 and the diode 124 are diagonally opposed within the second side bridge circuit 120, and the active switch 122 and the diode 123 are diagonally opposed within the second side bridge circuit 120.

By way of example, the active switches 103 and 106 are always ON and OFF simultaneously. The active switches 104 and 105 are always ON and OFF simultaneously.

By way of example, the active switches 103 and 104 are always ON and OFF alternatively. The active switches 105 and 106 are always ON and OFF alternatively. The active switches 121 and 122 are always ON and OFF alternatively.

By way of example, the actives switches 103, 104, 105, 106, 121, and 122 have similar configuration. Using the active switch 103 for example, the active switch 103 includes a power transistor $S_1$, a flyback diode or snubber diode $D_1$, and a parasitic capacitor or snubber capacitor $C_1$. The power transistor $S_1$ has a gate G that receives a gating signal or gating voltage signal, a collector C and an emitter E. The flyback diode $D_1$ connects anti-parallel across the collector C and the emitter E of the power transistor $S_1$. By way of example, the emitter E of the power transistor $S_1$ connects to high terminal of the primary winding of the transformer 130, and the emitter of the power transistor $S_b$ of the active switch 121 in the second side bridge circuit 120 connects to high terminal of the secondary winding of the transformer 130.

As an example, the power transistors of the active switches 103, 104, 105, 106, 121 and 122 are isolated gate bipolar transistors (IGBT) or metal-oxide-semiconductor field-effect transistors (MOSFET).

By way of example, the diodes 123 and 124 are output rectifier diodes. By way of example, the first side bridge circuit 110 includes a DC source 102 with an input voltage of $V_s$. The second side bridge circuit 120 includes a capacitor 128 and a load 126 with an output voltage of $V_o$. By way of example, the capacitor 128 functions as an output filter, which has a capacitance large enough to keep output voltage ripple free or almost ripple free. The load 126 can be active or passive load. By way of example, the load 126 is a battery, a light emitting diode (LED) or any other electronic devices that are suitable to be driven by a SDAB converter.

In an example embodiment, the transformer 130 is a high-frequency transformer that gives a galvanic isolation for two sides of the SDAB converter. $v_p$ and $v_s$ represents primary and secondary voltages of the transformer 130 respectively. By way of example, there is a leakage inductance ($L_s$) represented by an inductor 132 connected in series to high terminal of the primary winding of the transformer 130. The difference and variations between $v_p$ and $v_s$ determines a transformer current ($i_L$) of the transformer 130.

By way of example, both the first side bridge circuit 110 and the second side bridge circuit 120 is driven by square waveforms with 50% duty cycle.

As an example, the phase shift angle $\Phi$ is defined as the angle by which the turn-on moment of the power transistor $S_1$ of the active switch 103 leads that of the power transistor $S_a$ of the active switch 122. Zero-crossing angle α is defined as the angle by which the turn-on moment of the power transistor $S_1$ of the active switch 103 leads the moment when the transformer current $i_L$ changes from negative to positive.

As another example, the phase shift angle $\Phi$ is defined as the angle by which the turn-on moment of the power transistor $S_2$ of the active switch 104 leads that of the power transistor $S_b$ of the active switch 121. Zero-crossing angle α is defined as the angle by which the turn-on moment of the power transistor $S_2$ of the active switch 104 leads the moment when the transformer current $i_L$ changes from positive to negative.

As shown in FIG. 1, a microcontroller 140 communicates with and controls the SDAB converter 101. The microcontroller 140 includes a PWM circuit 142, a processor 144 and a non-transitory computer-readable medium 146. The non-transitory computer-readable medium 146 has stored thereon instructions that when executed cause the processor 144 to process and control the SDAB converter 101. For example, the microcontroller 140 controls gating signals that are applied to each gate of power transistors of the active switches 103-106 and 121-122 such that a fast transition from one steady state to another for the SDAB converter 101 is achieved.

Figure 2:
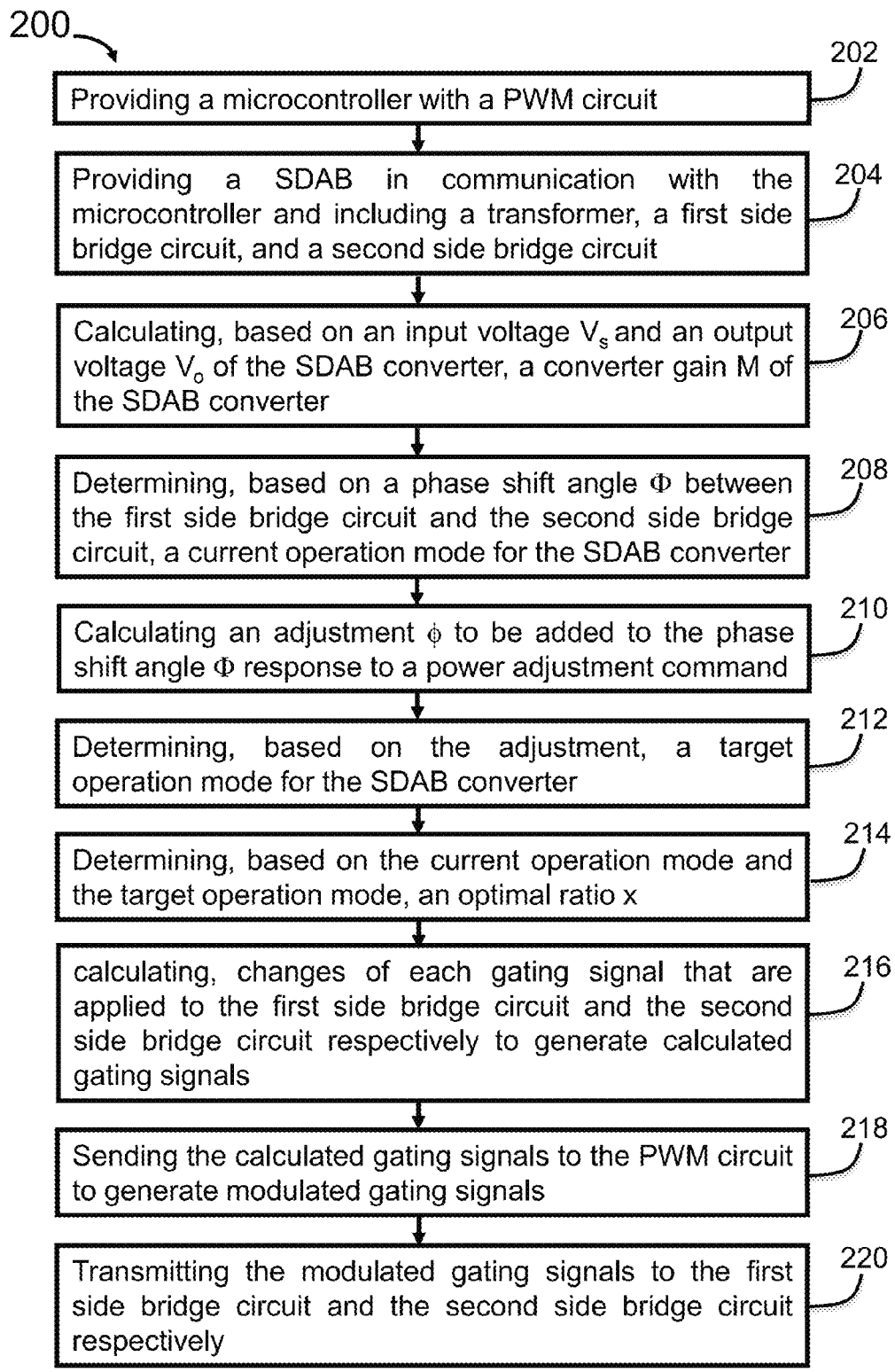
FIG. 2 shows a method that is executed by a microcontroller to control a SDAB converter in accordance with an example embodiment.

FIG. 2 shows a method 200 that is executed by a microcontroller to control a SDAB converter in accordance with an example embodiment.

At Block 202, it is provided a microcontroller with a PWM circuit. By way of example, the microcontroller controls gating signals or gating voltage signals of active switches of a first side bridge circuit and a second side bridge circuit of a SDAB converter to reduce or eliminate DC or DC bias current in a transformer of the SDAB converter during state transition and shorten transition time.

At Block 204, it is provided a SDAB converter. The SDAB converter is in communication with the microcontroller and includes a transformer with a primary winding and a secondary winding with a primary-to-secondary turns ratio of 1:n, a first side bridge circuit that connects to the primary winding of the transformer and includes four active switches, and a second side bridge circuit that connects to the secondary winding of the transformer and includes two active switches and two diodes.

At Block 206, the microcontroller calculates a converter gain M of the SDAB converter based on an input voltage $V_s$ and an output voltage $V_o$ of the SDAB converter, wherein $M=nV_o/V_s$.

As an example, the microcontroller senses the input voltage $V_s$ and the output voltage $V_o$ of the SDAB converter. As another example, the SDAB converter sends or transmits the input voltage $V_s$ and the output voltage $V_o$ to the microcontroller such that the converter gain M is determined by the microcontroller.

At Block 208, the microcontroller determines a current operation mode for the SDAB converter based on a phase shift angle $\Phi$ between the first side bridge circuit and the second side bridge circuit.

By way of example, the microcontroller determines whether the current operation mode is Mode A, Mode B, Mode C or DCM based on a numerical relationship between the phase shift angle $\Phi$ and the converter gain M. For example, when M>1 and $\Phi$>(M−1)π/M, or M<1 and $\Phi$>(1−M)π/2, the current operation mode is Mode A that is a buck-boost mode. When M<1 and 0<$\Phi$<(1−M)π/2, the current operation mode is Mode B that is a buck mode. When M<1 and $\Phi$<0, the current operation mode is Mode C that is a buck mode. Otherwise, the current operation mode is DCM.

At Block 210, response to a power adjustment command, the microcontroller calculates adjustment ϕ to be added to the phase shift angle $\Phi$.

By way of example, a power adjustment command is signal or waveform that is received from an external device to command the SDAB converter to move from one steady state to another. The microcontroller responds to the command and divides the adjustment on phase shift angle into two parts in an optimal way such that the SDAB converter achieves a fast transition.

Example embodiments include formulae that calculate power for the SDAB converter in each operation mode. By way of example, the formulae are stored in the microcontroller, stored in local memory, stored in non-local memory, or provided to the microcontroller (such as being transmitted to the microcontroller). By way of example, the power for the SDAB converter in operation modes A, B and C are represented by $P=P_A(\Phi)$, $P=P_B(\Phi)$, $P=P_C(\Phi)$ respectively. With information of current input and output voltage, as stated in the Block 206, the converter gain M is determined by the microcontroller. As stated in the Block 208, the current operation mode for the SDAB converter is determined. Thus, the boundary power for the current operation mode can be determined. As an example, the current operation mode is Mode B, then the maximum power is $P_A((1-M)\pi/2)$ or $P_B((1-M)\pi/2)$, wherein (1−M)π/2 is the boundary phase shift angle between Mode A and B. The minimum power is $P_B(0)$, wherein 0 is the boundary phase shift angle between Mode C and B. If the power P* after power adjustment command is between the maximum power and the minimum power, then the new phase shift angle ($\Phi$+ϕ) can be calculated from $P^*=P_B(\Phi+\phi)$. If P* is larger than $P_A((1-M)\pi/2)$ or $P_B((1-M)\pi/2)$, then the new phase shift angle ($\Phi$+ϕ) can be calculated from $P^*=P_A(\Phi+\phi)$. If P* is smaller than $P_B(0)$, then the new phase shift angle ($\Phi$+ϕ) can be calculated from $P^*=P_C(\Phi+\phi)$.

At Block 212, the microcontroller determines a target operation mode for the SDAB converter based on the adjustment.

By way of example, the microcontroller determines whether the target operation mode is Mode A, Mode B, Mode C or DCM based on a numerical relationship between the adjusted phase shift angle ($\Phi$+ϕ) and the converter gain M. For example, when M>1 and ($\Phi$+ϕ)>(M−1)π/M, or M<1 and ($\Phi$+ϕ)>(1−M)π/2, the target operation mode is Mode A that is a buck-boost mode. When M<1 and 0<($\Phi$+ϕ)<(1−M)π/2, the target operation mode is Mode B that is a buck mode. When M<1 and ($\Phi$+ϕ)<0, the target operation mode is Mode C that is a buck mode. Otherwise, the target operation mode is DCM.

At Block 214, the microcontroller calculates an optimal ratio x based on the current operation mode and the target operation mode.

By way of example, when the current and target operation modes are both Mode A, x=2/(2+M). When the current and target operation modes are both Mode B, x=2/[(2−M)(1+M)]. When the current and target operation modes are both Mode C, x=2/(2−M). When the current operation mode is Mode B and the target operation mode is Mode C, or when the current operation mode is Mode C and the target operation mode is Mode B, x=2/(2−M).

At Block 216, the microcontroller calculates changes of each gating signal that are applied to the first side bridge circuit and the second side bridge circuit respectively to generate calculated gating signals, wherein xϕ is a phase shift angle to be adjusted during transition on the first side bridge circuit, and (1−x)ϕ is a phase shift angle to be adjusted during transition on the second side bridge circuit.

At Block 218, the microcontroller sends the calculated gating signals to the PWM circuit to generate modulated gating signals.

At Block 220, the microcontroller sends or transmits the modulated gating signals to the first side bridge circuit and the second side bridge circuit respectively.

Figure 3:
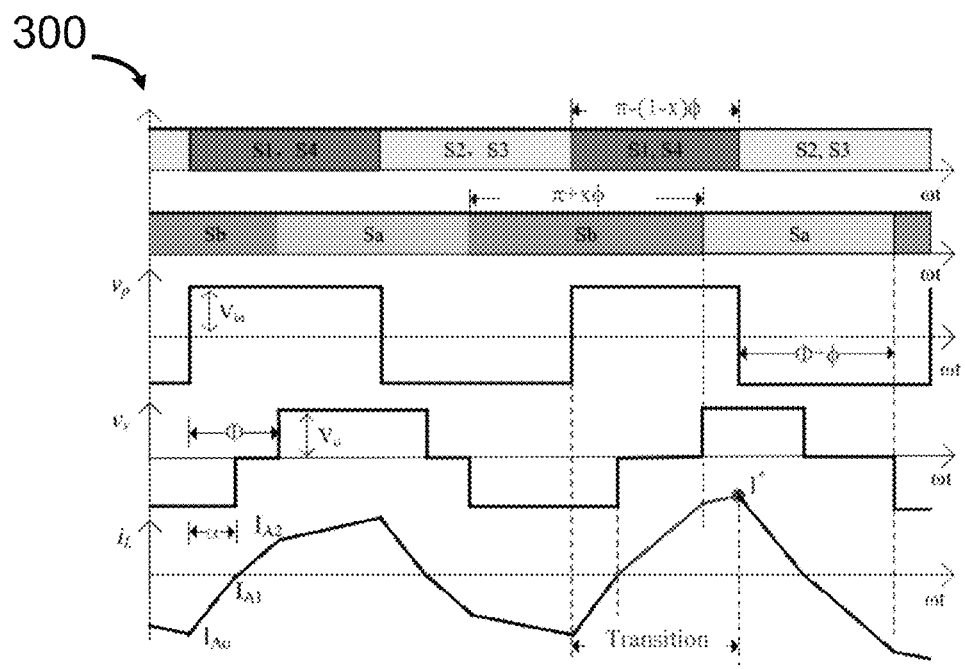
FIG. 3 shows operating waveforms for state transition within Mode A in accordance with an example embodiment.

FIG. 3 shows operating waveforms 300 for state transition within Mode A in accordance with an example embodiment.

By way of example, a SDAB converter initially works or operates in Mode A with a positive phase shift angle $\Phi$. The SDAB converter remains in Mode A after a state transition with a positive phase shift angle $(\Phi+\phi)$.

By way of example, for purpose of simplicity, values of all currents shown in the following are normalized with a base value of $I_B = V_s/(\omega_s L_s)$, wherein Vs is voltage of DC source at the first side bridge circuit of the SDAB converter, and $L_s$ is inductance of the inductor that connects in serious with the transformer of the SDAB converter, and $\omega_s$ is a switching angular frequency of the operating waveforms.

In Mode A, the important instantaneous values of transformer current $i_L$ in one period are:

$$I_{A0}(\Phi) = \frac{1+M}{2+M}[(M-1)\pi - M\Phi] \quad (1)$$

$$I_{A1}(\Phi) = 0 \quad (2)$$

$$I_{A2}(\Phi) = \frac{2\Phi + (M-1)\pi}{2+M} \quad (3)$$

For illustrative purpose, $\phi>0$ in FIG. 3. The current I* is calculated as:

$$I^* = \frac{1+M}{2+M}[M\Phi + (1-M)\pi] + (M-1+x)\phi \quad (4)$$

If x is optimal, the SDAB converter transfers or jumps into a new steady state or target steady state immediately. Thus, I* is the starting current in the new steady state and the followed equation is true:

$$I^* = -I_{A0}(\Phi+\phi) \quad (5)$$

With the help of Equations (1), (4) and (5), the optimal x is found as:

$$x = \frac{2}{2+M} \quad (6)$$

The validity range of this solution is:
(a) If $\phi>0$, then $(\Phi+\phi)$ should be smaller than $\pi/2$, which is the maximum output power point;
(b) If M>1 and $\phi<0$, then $(\Phi+\phi)$ should be larger or equal to $$\frac{(M-1)\pi}{M},$$

which is the boundary to DCM; and
(c) If M<1 and $\phi<0$, then $(\Phi+\phi)$ should be larger or equal to $$\frac{(1-M)\pi}{2},$$

which is the boundary to Mode B.

In the description above with reference to FIG. 3, meanings of symbols such as $V_{in}$, $I_{A0}(\Phi)$, $I_{A1}(\Phi)$, $I_{A2}(\Phi)$ and I* are shown in FIG. 3.

Figure 4:
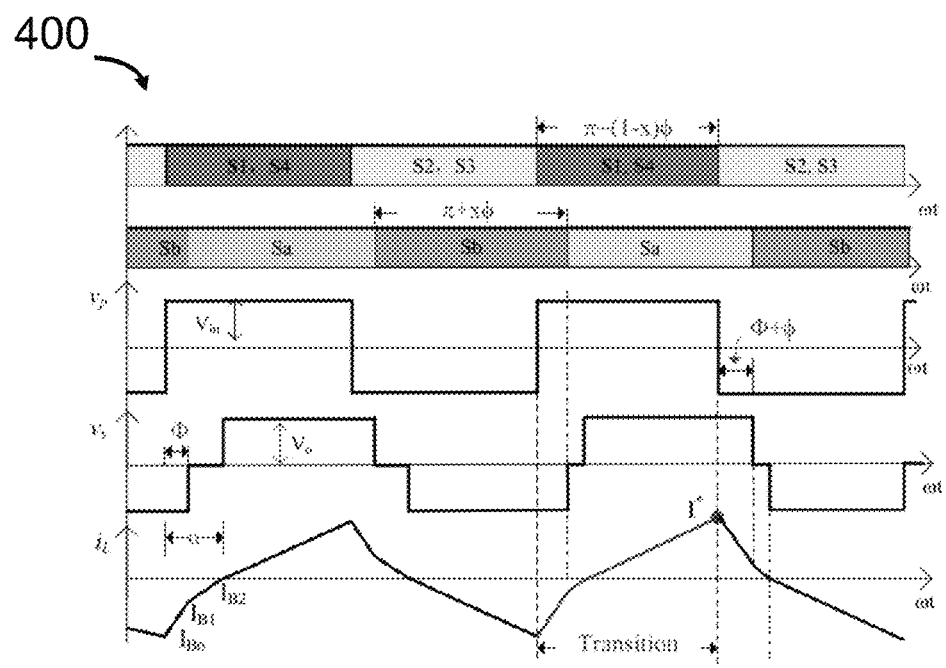
FIG. 4 shows operating waveforms for state transition within Mode B in accordance with an example embodiment.

FIG. 4 shows operating waveforms 400 for state transition within Mode B in accordance with an example embodiment.

By way of example, a SDAB converter initially works or operates in Mode B with a positive phase shift angle $\Phi$. The SDAB converter remains in Mode B after a state transition with a positive phase shift angle $(\Phi+\phi)$.

In Mode B, the important instantaneous values of transformer current $i_L$ in one period are:

$$I_{B0}(\Phi) = \frac{1-M}{M-2}(\pi + M\Phi) \quad (7)$$

$$I_{B1}(\Phi) = \frac{1-M}{M-2}\left(\pi + \frac{2}{M-1}\Phi\right) \quad (8)$$

$$I_{B2}(\Phi) = 0 \quad (9)$$

For illustrative purpose, $\phi>0$ in FIG. 4. The current I* is calculated as:

$$I^* = (1-M)\left[(x+xM-1)\phi + \frac{\pi + M\Phi}{2-M}\right] \quad (10)$$

If x is optimal, the SDAB converter transfers or jumps into a new steady state or target steady state immediately. Thus, I* is the starting current in the new steady state and the followed equation is true:

$$I^* = -I_{B0}(\Phi+\phi) \quad (11)$$

With the help of Equations (7), (10) and (11), the optimal x is found as:

$$x = \frac{2}{(2-M)(1+M)} \quad (12)$$

The validity range of this solution is:
(a) If $\phi>0$, then $(\Phi+\phi)$ should be not larger than $$\frac{(1-M)\pi}{2},$$

which is the boundary to Mode A; and
(b) If $\phi<0$, then $(\Phi+\phi)$ should be not less than zero, which is the boundary to Mode C.

In the description above with reference to FIG. 4, meanings of symbols such as $V_{in}$, $I_{B0}(\Phi)$, $I_{B1}(\Phi)$, $I_{B2}(\Phi)$ and I* are shown in FIG. 4.

Figure 5:
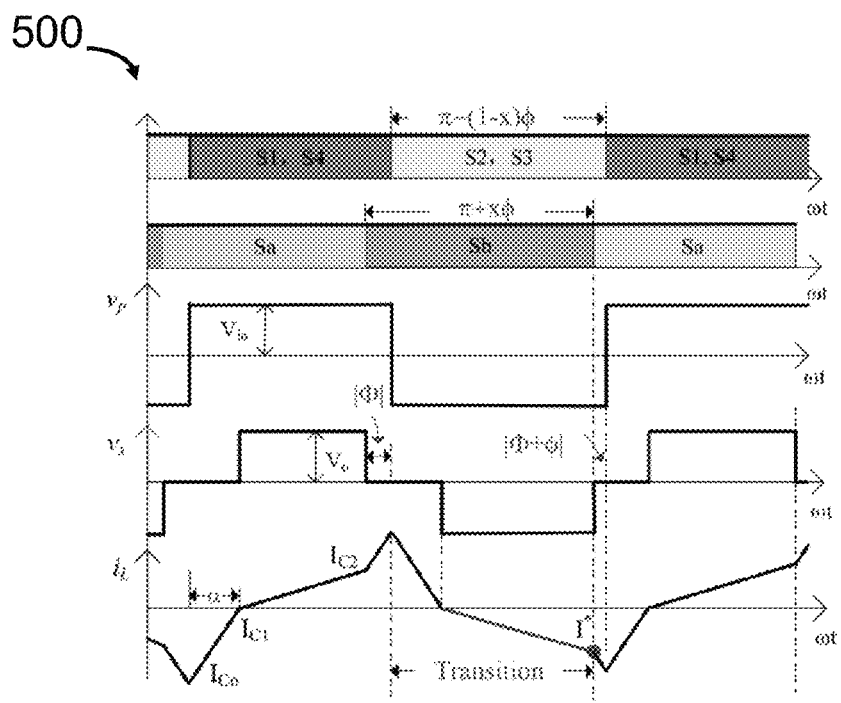
FIG. 5 shows operating waveforms for state transition within Mode C in accordance with an example embodiment.

FIG. 5 shows operating waveforms 500 for state transition within Mode C in accordance with an example embodiment.

By way of example, a SDAB converter initially works or operates in Mode C with a negative phase shift angle $\Phi$. The SDAB converter remains in Mode C after a state transition with a negative phase shift angle $(\Phi+\phi)$.

In Mode C, the important instantaneous values of transformer current $i_L$ in one period are:

$$I_{C0}(\Phi) = \frac{(M-1)\pi + M\Phi}{2-M} \quad (13)$$

$$I_{C1}(\Phi) = 0 \quad (14)$$

$$I_{C2}(\Phi) = \frac{M-1}{M-2}(2\Phi + \pi) \quad (15)$$

For illustrative purpose, $\phi > 0$ in FIG. 5. The current I* is calculated as:

$$I^* = \frac{1-M}{M-2}[\pi - (M-2)x\phi + 2\Phi] \quad (16)$$

If x is optimal, the SDAB converter transfers or jumps into a new steady state or target steady state immediately. Thus, I* is the starting current in the new steady state and the followed equation is true:

$$I^* = -I_{C2}(\Phi+\phi) \quad (17)$$

With the help of Equations (15), (16) and (17), the optimal x is found as:

$$x = \frac{2}{2-M} \quad (18)$$

The validity range of this solution is:
(a) If $\Phi > 0$, then $\Phi + \phi$ should be smaller than zero, which is the boundary to Mode B; and
(b) If $\Phi < 0$, then $\Phi + \phi$ should be larger or equal to which is the zero power condition.

In the description above with reference to FIG. 5, meanings of symbols such as $V_{in}$, $I_{C0}(\Phi)$, $I_{C1}(\Phi)$, $I_{C2}(\Phi)$ and I* are shown in FIG. 5.

Figure 6:
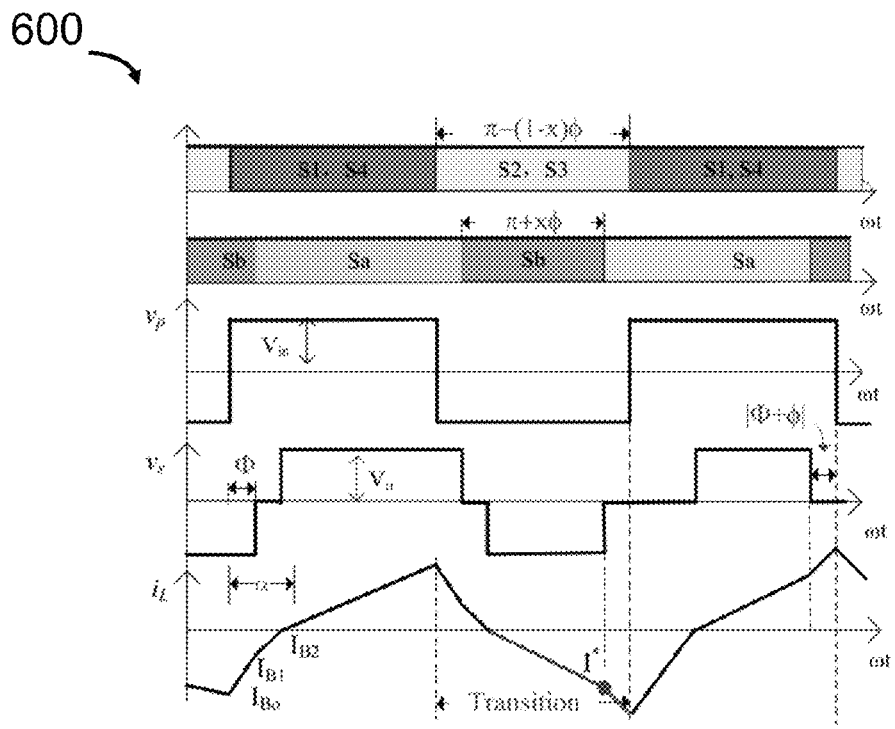
FIG. 6 shows operating waveforms for state transition from Mode B to Mode C in accordance with an example embodiment.

FIG. 6 shows operating waveforms 600 for state transition from Mode B to Mode C in accordance with an example embodiment.

By way of example, a SDAB converter initially works or operates in Mode B with a positive phase shift angle $\Phi$. The SDAB converter works or operates in Mode C after a state transition with a negative phase shift angle ($\Phi+\phi$).

$\phi$ is negative in FIG. 6. The current I* is found to be exactly same as Equation (16). If x is optimal, the SDAB converter transfers or jumps into a new steady state or target steady state immediately. Thus, I* is the starting current in the new steady state and Equation (17) should be satisfied. With the help of Equations (15), (16) and (17), the optimal x is found same as Equation (18). The validity range of this solution is $\phi < 0 < \Phi$ and $-\pi/2 < (\Phi+\phi) < 0$.

In the description above with reference to FIG. 6, meanings of symbols such as $V_{in}$, $I_{B0}(\Phi)$, $I_{B1}(\Phi)$, $I_{B2}(\Phi)$ and I* are shown in FIG. 6.

Figure 7:
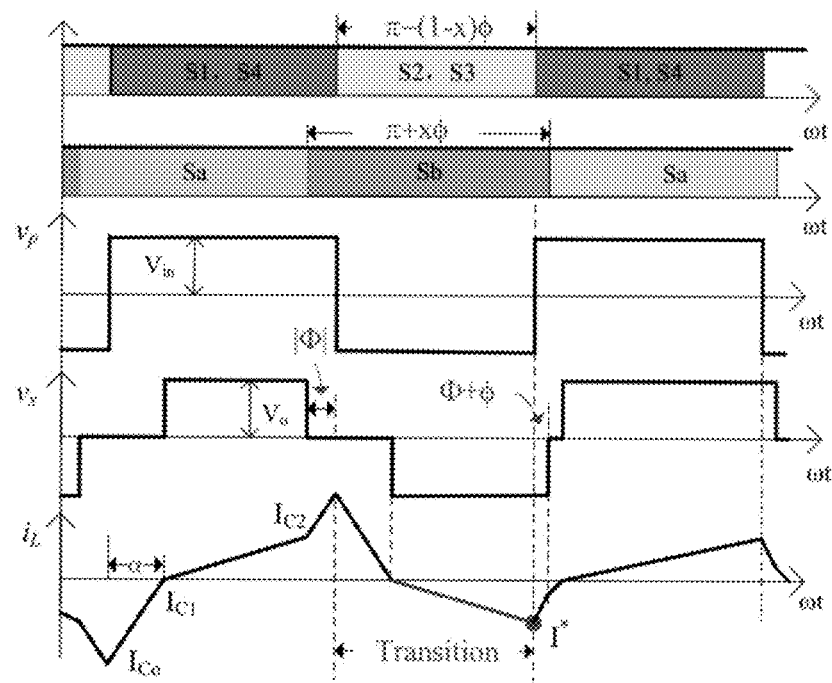
FIG. 7 shows operating waveforms for state transition from Mode C to Mode B in accordance with an example embodiment.

FIG. 7 shows operating waveforms 700 for state transition from Mode C to Mode B in accordance with an example embodiment.

By way of example, a SDAB converter initially works or operates in Mode C with a negative phase shift angle $\Phi$. The SDAB converter works or operates in Mode B after a state transition with a positive phase shift angle ($\Phi+\phi$).

$\phi$ is positive in FIG. 7. The current I* is calculated as:

$$I^* = (M-1)\left[(x-1)\phi + \frac{\pi + M\Phi}{2-M}\right] \quad (19)$$

If x is optimal, the SDAB converter transfers or jumps into a new steady state or target steady state immediately. Thus, I* is the starting current in the new steady state and the followed equation is true:

$$I^* = I_{B0}(\Phi+\phi) \quad (20)$$

With the help of Equations (7), (19) and (20), the optimal x is found as Equation (18). The validity range of this solution is $\Phi < 0 < \phi$ and $$0 < (\phi + \Phi) < \frac{(1-M)\pi}{2}.$$

In the description above with reference to FIG. 7, meanings of symbols such as $V_{in}$, $I_{C0}(\Phi)$, $I_{C1}(\Phi)$, $I_{C2}(\Phi)$ and I* are shown in FIG. 7.

Figure 8A:
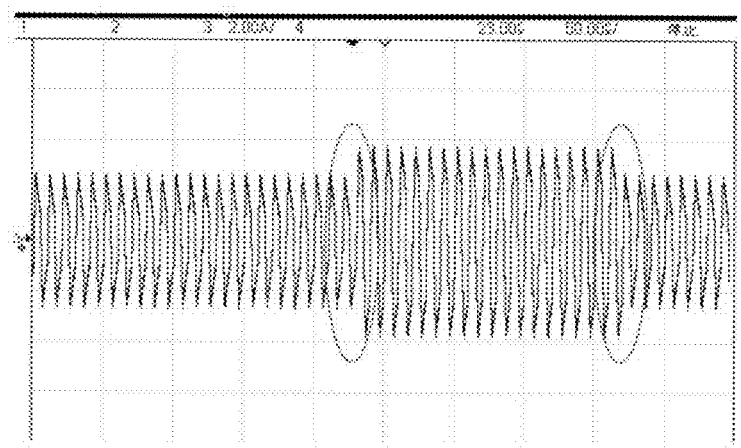
FIG. 8A shows experimental graph of transformer current for state transition within Mode A in accordance with an example embodiment.
Figures 8B, 8C:
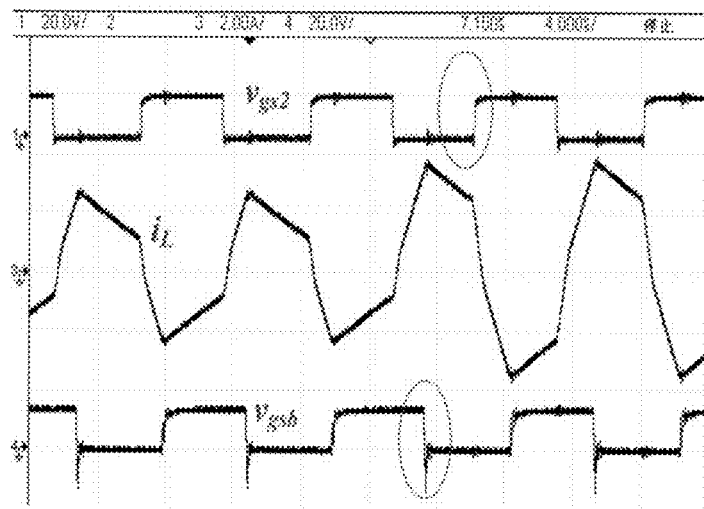
FIG. 8B shows experimental graph of gating signals of $S_b$, $S_2$ and transformer current when $\phi$ is positive for state transition within Mode A in accordance with an example embodiment.
FIG. 8C shows experimental graph of gating signals of $S_b$, $S_2$ and transformer current when $\phi$ is negative for state transition within Mode A in accordance with an example embodiment.

FIG. 8A shows experimental graph 810 of transformer current $i_L$ for state transition within Mode A in accordance with an example embodiment. FIG. 8B shows experimental graph 820 of gating signals of $S_b$, $S_2$ ($v_{gsb}$ and $v_{gs2}$ respectively as shown) and transformer current when $\phi$ is positive for state transition within Mode A in accordance with an example embodiment. FIG. 8C shows experimental graph 830 of gating signals of $S_b$, $S_2$ ($v_{gsb}$ and $v_{gs2}$ respectively as shown) and transformer current when $\phi$ is negative for state transition within Mode A in accordance with an example embodiment.

By way of example, M=1.25. The phase shift angle changes from 30° to 60° at first and then changes back after 20 cycles. As shown in FIG. 8A, the transformer current $i_L$ moves from one state to another instantly without introducing any DC bias current. According to Equation (6), x is found to be 0.654. The details of two transitions are amplified and shown in FIG. 8B and FIG. 8C respectively. It is shown in FIG. 8B that the on-time of $S_b$ is extended by 18.46° and the off-time $S_2$ is reduced by 11.54° such that the total phase shift angle is increased by 30°. The reverse process is executed as shown in FIG. 8C.

Figure 9A:
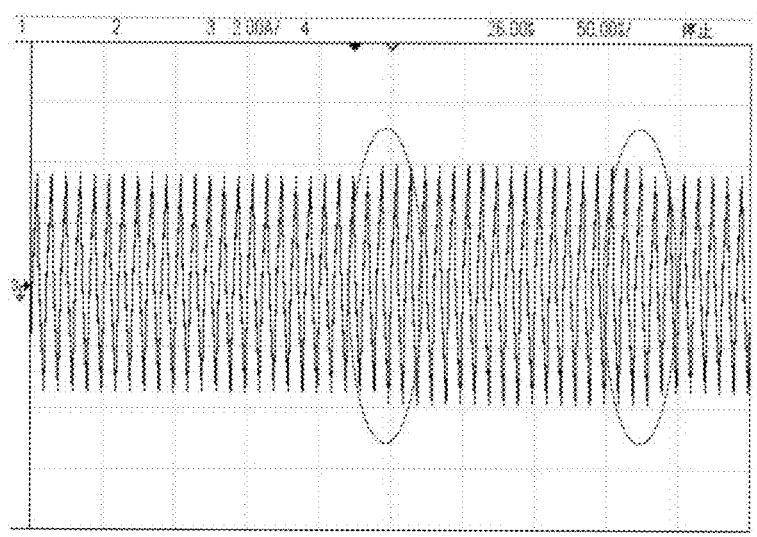
FIG. 9A shows experimental graph of transformer current for state transition within Mode B in accordance with an example embodiment.
Figure 9B:
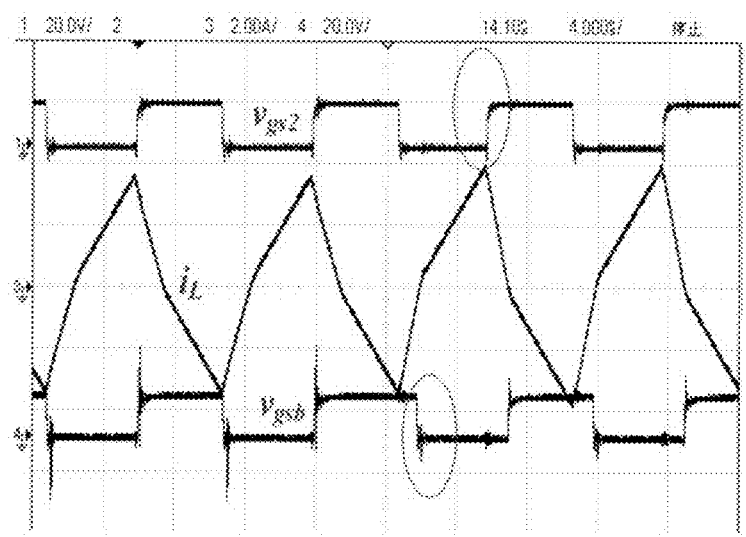
FIG. 9B shows experimental graph of gating signals of $S_b$, $S_2$ and transformer current when $\phi$ is positive for state transition within Mode B in accordance with an example embodiment.
Figure 9C:
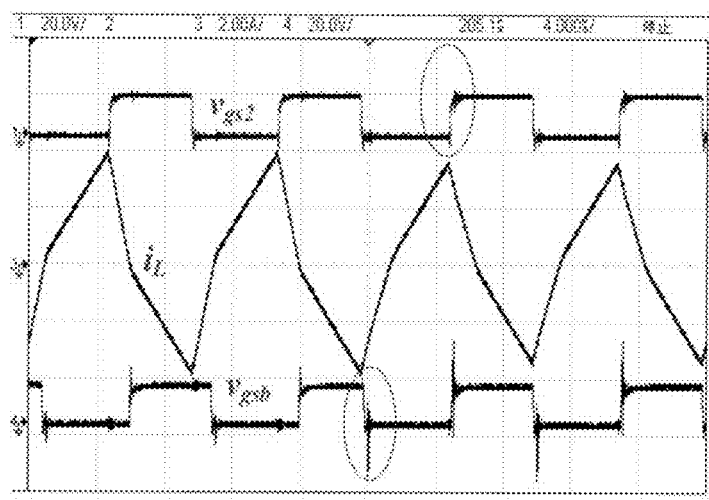
FIG. 9C shows experimental graph of gating signals of $S_b$, $S_2$ and transformer current when $\phi$ is negative for state transition within Mode B in accordance with an example embodiment.

FIG. 9A shows experimental graph 910 of transformer current $i_L$ for state transition within Mode B in accordance with an example embodiment. FIG. 9B shows experimental graph 920 of gating signals of $S_b$, $S_2$ ($v_{gsb}$ and $v_{gs2}$ respectively as shown) and transformer current when $\phi$ is positive for state transition within Mode B in accordance with an example embodiment. FIG. 9C shows experimental graph 930 of gating signals of $S_b$, $S_2$ ($v_{gsb}$ and $v_{gs2}$ respectively as shown) and transformer current when $\phi$ is negative for state transition within Mode B in accordance with an example embodiment.

By way of example, M=0.5. According to Equation (12), x is found to be 8/9. The phase shift angle changes between 8° and 28° in the two transitions. No DC bias current is observed during the transitions.

Figure 10A:
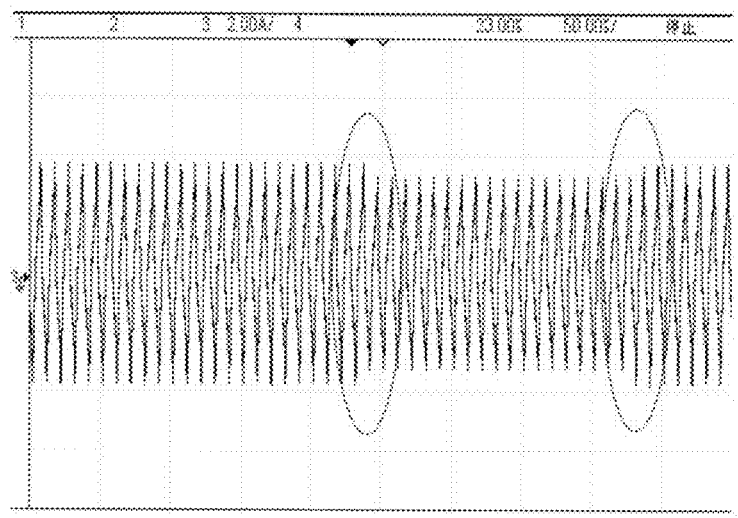
FIG. 10A shows experimental graph of transformer current for state transition within Mode C in accordance with an example embodiment.
Figure 10B:
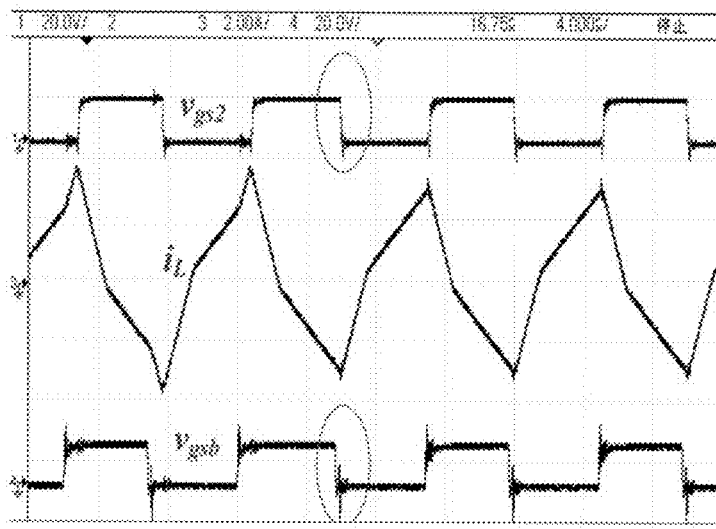
FIG. 10B shows experimental graph of gating signals of $S_b$, $S_2$ and transformer current when $\phi$ is positive for state transition within Mode C in accordance with an example embodiment.
Figure 10C:
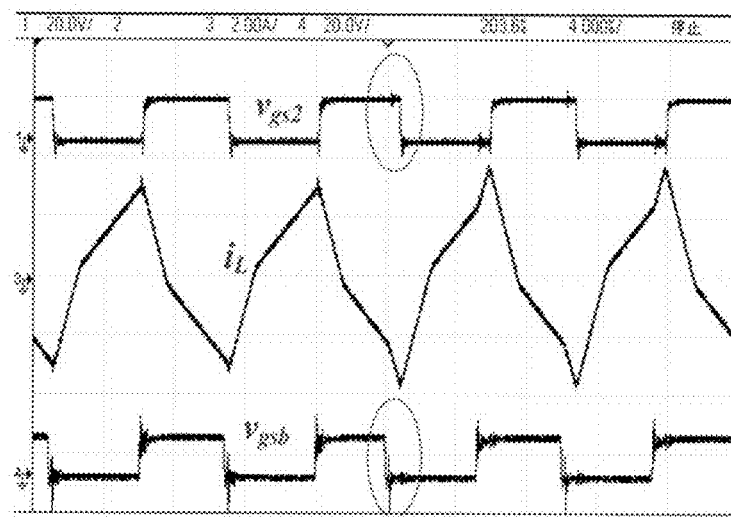
FIG. 10C shows experimental graph of gating signals of $S_b$, $S_2$ and transformer current when $\phi$ is negative for state transition within Mode C in accordance with an example embodiment.

FIG. 10A shows experimental graph of transformer current $i_L$ for state transition within Mode C in accordance with an example embodiment. FIG. 10B shows experimental graph of gating signals of $S_b$, $S_2$ ($v_{gsb}$ and $v_{gs2}$ respectively as shown) and transformer current when $\phi$ is positive for state transition within Mode C in accordance with an example embodiment. FIG. 10C shows experimental graph of gating signals of $S_b$, $S_2$ ($v_{gsb}$ and $v_{gs2}$ respectively as shown) and transformer current when ϕ is negative for state transition within Mode C in accordance with an example embodiment.

By way of example, M=2/3, which makes x=1.5 an 1−x=−0.5. The phase shift angle changes from −30° to −10° and then changes back after 20 cycles. As shown in FIG. 10B, the on-time of $S_b$ is extended by 30° and the off-time of $S_2$ is also extended by 10° when the phase shift angle is increased by 20°. When the phase shift angle is reduced as shown in FIG. 10C, the on-time of $S_b$ is shorten by 30° and the off-time of $S_2$ is reduced by 10°.

Figure 11A:
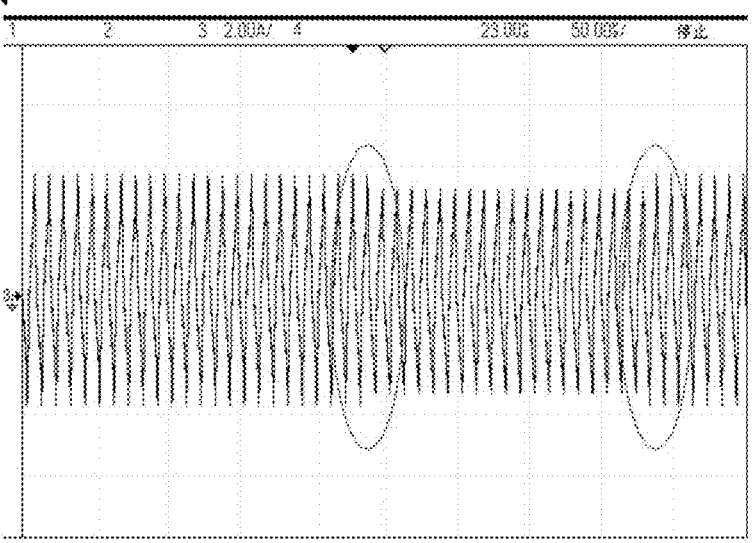
FIG. 11A shows experimental graph of transformer current for state transition between Mode B and Mode C in accordance with an example embodiment.
Figure 11B:
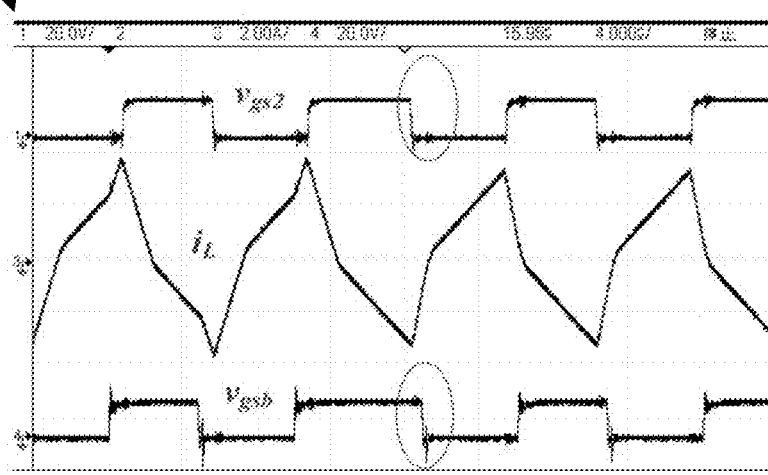
FIG. 11B shows experimental graph of gating signals of $S_b$, $S_2$ and transformer current for state transition from Mode C to Mode B in accordance with an example embodiment.
Figure 11C:
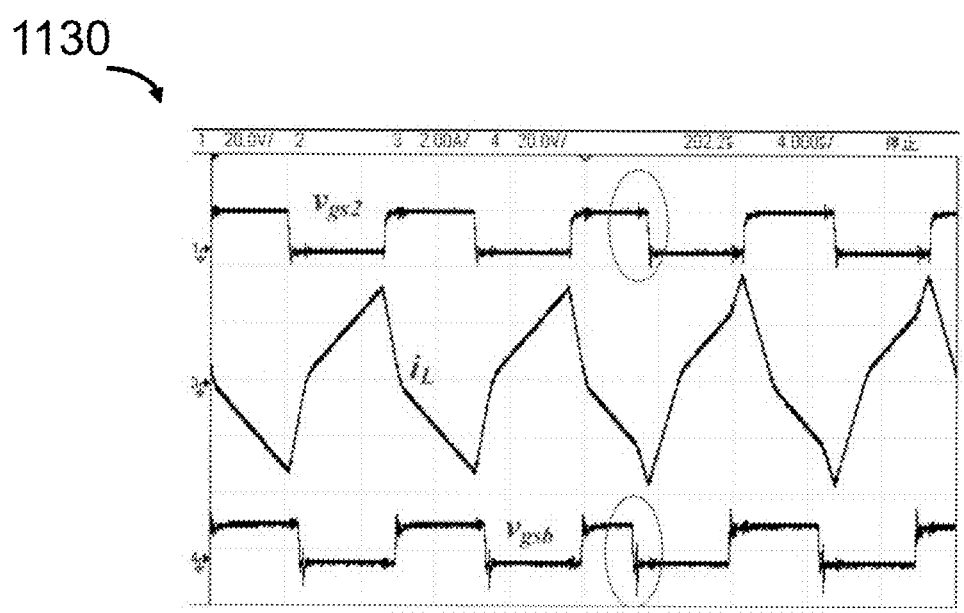
FIG. 11C shows experimental graph of gating signals of $S_b$, $S_2$ and transformer current for state transition from Mode B to Mode C in accordance with an example embodiment.

FIG. 11A shows experimental graph 1110 of transformer current $i_L$ for state transition between Mode B and Mode C in accordance with an example embodiment. FIG. 11B shows experimental graph 1120 of gating signals of $S_b$, $S_2$ ($v_{gsb}$ and $v_{gs2}$ respectively) and transformer current for state transition from Mode C to Mode B in accordance with an example embodiment. FIG. 11C shows experimental graph 1130 of gating signals of $S_b$, $S_2$ ($v_{gsb}$ and $v_{gs2}$ respectively) and transformer current for state transition from Mode B to Mode C in accordance with an example embodiment.

By way of example, M=2/3. The phase shift angle varies between −30° and −20°. According to Equation (18), x is found to be 1.5. The adjustment to the gating signal of $S_6$ is 75° and the adjustment to the gating signal of $S_2$ is 25°.

As used herein, the term "processor" refers to one or more circuits, devices, and/or processing cores that process data, such as computer program instructions.

In some example embodiments, the methods illustrated herein and data and instructions associated therewith, are stored in respective storage devices that are implemented as non-transitory computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed a processor, controller, and other hardware discussed herein. Furthermore, blocks and/or methods discussed herein can be executed automatically with or without instruction from a user.

The methods in accordance with example embodiments are provided as examples, and examples from one method should not be construed to limit examples from another method. Figures and other information show example data and example structures; other data and other database structures can be implemented with example embodiments. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

What is claimed is:

1. A method executed by a microcontroller to control a semi-dual-active-bridge (SDAB) converter, the method comprising:
    providing the microcontroller with a Pulse Width Modulation (PWM) circuit;
    providing the SDAB converter in communication with the microcontroller and including a transformer with a primary winding and a secondary winding with a primary-to-secondary turns ratio of 1:n, a first side bridge circuit that connects to the primary winding of the transformer and includes four active switches, and a second side bridge circuit that connects to the secondary winding of the transformer and includes two active switches and two diodes;
    calculating, by the microcontroller and based on an input voltage $V_s$ and an output voltage $V_o$ of the SDAB converter, a converter gain M of the SDAB converter, wherein $M=nV_o/V_s$;
    determining, by the microcontroller and based on a phase shift angle Φ between the first side bridge circuit and the second side bridge circuit, a current operation mode for the SDAB converter;
    calculating, by the microcontroller, an adjustment ϕ to be added to the phase shift angle Φ response to a power adjustment command;
    determining, by the microcontroller and based on the adjustment, a target operation mode for the SDAB converter;
    determining, by the microcontroller and based on the current operation mode and the target operation mode, an optimal ratio x;
    calculating, by the microcontroller, changes of each gating signal that are applied to the first side bridge circuit and the second side bridge circuit respectively to generate calculated gating signals, wherein xϕ is a phase shift angle to be adjusted during transition on the first side bridge circuit, and (1−x)ϕ is a phase shift angle to be adjusted during transition on the second side bridge circuit;
    sending, by the microcontroller, the calculated gating signals to the PWM circuit to generate modulated gating signals; and
    transmitting, by the microcontroller, the modulated gating signals to the first side bridge circuit and the second side bridge circuit respectively.

2. The method of claim 1, wherein the current operation mode is Mode A that is a buck-boost mode wherein M>1 and Φ>(M−1)π/M, or M<1 and Φ>(1−M)π/2;
    wherein the target operation mode is Mode A that is a buck-boost mode wherein M>1 and (Φ+ϕ)>(M−1)π/M, or M<1 and (Φ+ϕ)>(1−M)π/2; and
    wherein x=2/(2+M).

3. The method of claim 1, wherein the current operation mode is Mode B that is a buck mode wherein M<1 and 0<Φ<(1−M)π/2;
    wherein the target operation mode is Mode B that is a buck mode wherein M<1 and 0<(Φ+ϕ)<(1−M)π/2; and
    wherein x=2/[(2−M)(1+M)].

4. The method of claim 1, wherein the current operation mode is Mode C that is a buck mode wherein M<1 and Φ<0;
    wherein the target operation mode is Mode C that is a buck mode wherein M<1 and (Φ+ϕ)<0; and
    wherein x=2/(2−M).

5. The method of claim 1, wherein the current operation mode is Mode B that is a buck mode wherein $M<1$ and $0<\Phi<(1-M)\pi/2$;

wherein the target operation mode is Mode C that is a buck mode wherein $M<1$ and $(\Phi+\phi)<0$, and wherein $x=2/(2-M)$.

6. The method of claim 1, wherein the current operation mode is Mode C that is a buck mode wherein $M<1$ and $\Phi<0$;

wherein the target operation mode is Mode B that is a buck mode wherein $M<1$ and $0<(\Phi+\phi)<(1-M)\pi/2$; and wherein $x=2/(2-M)$.

7. The method of claim 1, wherein the current operation mode is discontinuous-current mode (DCM) wherein none of conditions (1), (2), and (3) is satisfied in which the conditions are:

(1) $M>1$ and $\Phi>(M-1)\pi/M$, or $M<1$ and $\Phi>(1-M)\pi/2$;

(2) $M<1$ and $0<\Phi<(1-M)\pi/2$; and (3) $M<1$ and $\Phi<0$, and wherein the target operation mode is DCM wherein none of conditions (a), (b), and (c) is satisfied in which the conditions are:

(a) $M>1$ and $(\Phi+\phi)>(M-1)\pi/M$, or $M<1$ and $(\Phi+\phi)>(1-M)\pi/2$;

(b) $M<1$ and $0<(\Phi+\phi)<(1-M)\pi/2$; and (c) $M<1$ and $(\Phi+\phi)<0$.

8. A semi-dual-active-bridge (SDAB) converter system, comprising:

a SDAB converter that includes a transformer having a primary winding and a secondary winding with a primary-to-secondary turns ratio of 1:n, a first side bridge circuit that connects to the primary winding of the transformer and includes four active switches, and a second side bridge circuit that connects to the secondary winding of the transformer and includes two active switches and two diodes; and a microcontroller that controls the SDAB converter and includes:

a Pulse Width Modulation (PWM) circuit;

a processor; and a non-transitory computer-readable medium having stored thereon instructions that when executed cause the processor to:

calculate, based on an input voltage $V_s$ and an output voltage $V_o$ of the SDAB converter, a converter gain M of the SDAB converter, wherein $M=nV_o/V_s$;

determine, based on a phase shift angle $\Phi$ between the first side bridge circuit and the second side bridge circuit, a current operation mode for the SDAB converter;

calculate an adjustment $\phi$ to be added to the phase shift angle $\Phi$ response to a power adjustment command;

determine, based on the adjustment, a target operation mode for the SDAB converter;

determine, based on the current operation mode and the target operation mode, an optimal ratio x;

calculate changes of each gating signal that are applied to the first side bridge circuit and the second side bridge circuit, wherein $x\phi$ is a phase shift angle to be adjusted during transition on the first side bridge circuit, and $(1-x)\phi$ is a phase shift angle to be adjusted during transition on the second side bridge circuit;

send the calculated gating signals to the PWM circuit to generate modulated gating signals; and transmit the modulated gating signals to the first side bridge circuit and the second side bridge circuit respectively.

9. The SDAB converter system of claim 8, wherein the current operation mode is Mode A that is a buck-boost mode wherein $M>1$ and $\Phi>(M-1)\pi/M$, or $M<1$ and $\Phi>(1-M)\pi/2$;

wherein the target operation mode is Mode A that is a buck-boost mode wherein $M>1$ and $(\Phi+\phi)>(M-1)\pi/M$, or $M<1$ and $(\Phi+\phi)>(1-M)\pi/2$; and wherein $x=2/(2+M)$.

10. The SDAB converter system of claim 8, wherein the current operation mode is Mode B that is a buck mode wherein $M<1$ and $0<\Phi<(1-M)\pi/2$;

wherein the target operation mode is Mode B that is a buck mode wherein $M<1$ and $0<(\Phi+\phi)<(1-M)\pi/2$; and wherein $x=2/[(2-M)(1+M)]$.

11. The SDAB converter system of claim 8, wherein the current operation mode is Mode C that is a buck mode wherein $M<1$ and $\Phi<0$;

wherein the target operation mode is Mode C that is a buck mode wherein $M<1$ and $(\Phi+\phi)<0$; and wherein $x=2/(2-M)$.

12. The SDAB converter system of claim 8, wherein the current operation mode is Mode B that is a buck mode wherein $M<1$ and $0<\Phi<(1-M)\pi/2$;

wherein the target operation mode is Mode C that is a buck mode wherein $M<1$ and $(\Phi+\phi)<0$, and wherein $x=2/(2-M)$.

13. The SDAB converter system of claim 8, wherein the current operation mode is Mode C that is a buck mode wherein $M<1$ and $\Phi<0$;

wherein the target operation mode is Mode B that is a buck mode wherein $M<1$ and $0<(\Phi+\phi)<(1-M)\pi/2$; and wherein $x=2/(2-M)$.

14. The SDAB converter system of claim 8, wherein the current operation mode is discontinuous-current mode (DCM) wherein none of conditions (1), (2), and (3) is satisfied in which the conditions are:

(1) $M>1$ and $\Phi>(M-1)\pi/M$, or $M<1$ and $\Phi>(1-M)\pi/2$;

(2) $M<1$ and $0<\Phi<(1-M)\pi/2$; and (3) $M<1$ and $\Phi<0$, and wherein the target operation mode is DCM wherein none of conditions (a), (b), and (c) is satisfied in which the conditions are:

(a) $M>1$ and $(\Phi+\phi)>(M-1)\pi/M$, or $M<1$ and $(\Phi+\phi)>(1-M)\pi/2$;

(b) $M<1$ and $0<(\Phi+\phi)<(1-M)\pi/2$; and (c) $M<1$ and $(\Phi+\phi)<0$.

15. A method executed by a semi-dual-active-bridge (SDAB) converter system to control a SDAB converter of the SDAB converter system, the method comprising:

providing a microcontroller with a Pulse Width Modulation (PWM) circuit;

providing the SDAB converter in communication with the microcontroller and including a transformer with a primary winding and a secondary winding with a primary-to-secondary turns ratio of 1:n, a first side bridge circuit that connects to the primary winding of the transformer and includes four active switches, and a second side bridge circuit that connects to the secondary winding of the transformer and includes two active switches and two diodes;

sending, by the SDAB converter, an input voltage $V_s$ and an output voltage $V_o$ of the SDAB converter to the microcontroller;

determining, by the microcontroller and based on an input voltage $V_s$ and an output voltage $V_o$ of the SDAB converter, a converter gain M of the SDAB converter, wherein $M=nV_o/V_s$;

determining, by the microcontroller and based on a phase shift angle Φ between the first side bridge circuit and the second side bridge circuit, a current operation mode for the SDAB converter;

calculating, by the microcontroller, an adjustment ϕ to be added to the phase shift angle Φ response to a power adjustment command;

determining, by the microcontroller and based on the adjustment, a target operation mode for the SDAB converter;

determining, by the microcontroller and based on the current operation mode and the target operation mode, an optimal ratio x;

calculating, by the microcontroller, changes of each gating signal that are applied to the first side bridge circuit and the second side bridge circuit to generate calculated gating signals, wherein xϕ is the phase shift angle to be adjusted during transition on the first side bridge circuit, and (1−x)ϕ is the phase shift angle to be adjusted during transition on the second side bridge circuit; and sending, by the microcontroller, the calculated gating signals to the PWM circuit to generate modulated gating signals; and transmitting, by the microcontroller, the modulated gating signals to the first side bridge circuit and the second side bridge circuit respectively.

16. The method of claim 15, wherein the current operation mode is Mode A that is a buck-boost mode wherein M>1 and Φ>(M−1)π/M, or M<1 and Φ>(1−M)π/2;

wherein the target operation mode is Mode A that is a buck-boost mode wherein M>1 and (Φ+ϕ)>(M−1)π/M, or M<1 and (Φ+ϕ)>(1−M)π/2; and wherein x=2/(2+M).

17. The method of claim 15, wherein the current operation mode is Mode B that is a buck mode wherein M<1 and 0<Φ<(1−M)π/2;

wherein the target operation mode is Mode B that is a buck mode wherein M<1 and 0<(Φ+ϕ)<(1−M)π/2; and wherein x=2/[(2−M)(1+M)].

18. The method of claim 15, wherein the current operation mode is Mode C that is a buck mode wherein M<1 and Φ<0;

wherein the target operation mode is Mode C that is a buck mode wherein M<1 and (Φ+ϕ)<0; and wherein x=2/(2−M).

19. The method of claim 15, wherein the current operation mode is Mode B that is a buck mode wherein M<1 and 0<Φ<(1−M)π/2;

wherein the target operation mode is Mode C that is a buck mode wherein M<1 and (Φ+ϕ)<0, and wherein x=2/(2−M).

20. The method of claim 15, wherein the current operation mode is Mode C that is a buck mode wherein M<1 and Φ<0;

wherein the target operation mode is Mode B that is a buck mode wherein M<1 and 0<(Φ+ϕ)<(1−M)π/2; and wherein x=2/(2−M).

* * * * *